United States Patent [19]

Smith

[11] Patent Number: 4,853,960
[45] Date of Patent: * Aug. 1, 1989

[54] STATION INTERFACE AND PROTECTOR APPARATUS

[75] Inventor: Thomas J. Smith, Bay Shore, N.Y.

[73] Assignee: TII Industries Inc., Copiague, N.Y.

[*] Notice: The portion of the term of this patent subsequent to Nov. 25, 2003 has been disclaimed.

[21] Appl. No.: 80,003

[22] Filed: Jul. 31, 1987

[51] Int. Cl.$^4$ .......................... H04M 9/00; H01R 9/24
[52] U.S. Cl. ..................................... 379/437; 361/119; 379/399; 379/412; 379/419; 379/438; 379/445; 439/133; 439/709; 439/712; 439/716; 439/718
[58] Field of Search .................. 379/437, 27, 399, 412, 379/419, 437, 438, 445; 439/133, 718, 709, 712, 716, 717; 361/119

[56] References Cited

U.S. PATENT DOCUMENTS

| | | | |
|---|---|---|---|
| 4,047,787 | 9/1977 | Gumb et al. | 439/638 |
| 4,103,985 | 8/1978 | Krolak et al. | 439/638 |
| 4,188,505 | 2/1980 | O'Connor | 439/676 |
| 4,488,008 | 12/1984 | Dellinger et al. | 379/412 |
| 4,562,311 | 12/1985 | Dola | 379/27 |
| 4,613,732 | 9/1986 | Cwirzen et al. | 379/412 |
| 4,624,514 | 11/1986 | Smith | 379/412 |
| 4,647,725 | 3/1987 | Dellinger et al. | 379/399 |
| 4,729,059 | 3/1988 | Wang | 439/709 |
| 4,741,032 | 4/1988 | Hampton | 361/356 |

FOREIGN PATENT DOCUMENTS

| | | | |
|---|---|---|---|
| 1046577 | 1/1979 | Canada | 379/412 |
| 1205934 | 6/1986 | Canada | 379/399 |

OTHER PUBLICATIONS

Keptel SNI 2000 Literature, Jun. 1984.
Sylvania Control Devices-Dec. 1984.
AT&T-2000 Network Interface Unit, Dec. 1985.

Primary Examiner—Jin F. Ng
Assistant Examiner—Danita R. Byrd
Attorney, Agent, or Firm—Sachs & Sachs

[57] ABSTRACT

A station interface and protector apparatus for use on a telephone line pair includes a protector device having terminals connected from each line to a ground terminal, via a gas discharged tube and/or a protective air gap and includes an insulated cover which covers the protector device and is provided with a telephone receptacle (jack) to which the incoming telephone line pair is connected. A cable having a plurality of wires therein is terminated on one end with a cooperating telephone line plug disposed within the receptacle with the other end of the cable wires being connected to a plurality of terminals provided in the cover which is additionally adapted to receive the subscribers telephone line pairs. By removing the cable plug from the jack provided in the cover the incoming telephone line may be isolated from the subscribers wiring, thus inserting a known operating telephone into the housing receptacle and operating the telephone will immediately determine if the problem exists in the incoming telephone lines or the subscriber's wiring. The bracket is provided to permit the subscriber to lock the interface and protector apparatus while still permitting the telephone company serviceman to override the locking mechanism for service of the overvoltage protection device and/or the incoming telephone line pair.

5 Claims, 5 Drawing Sheets

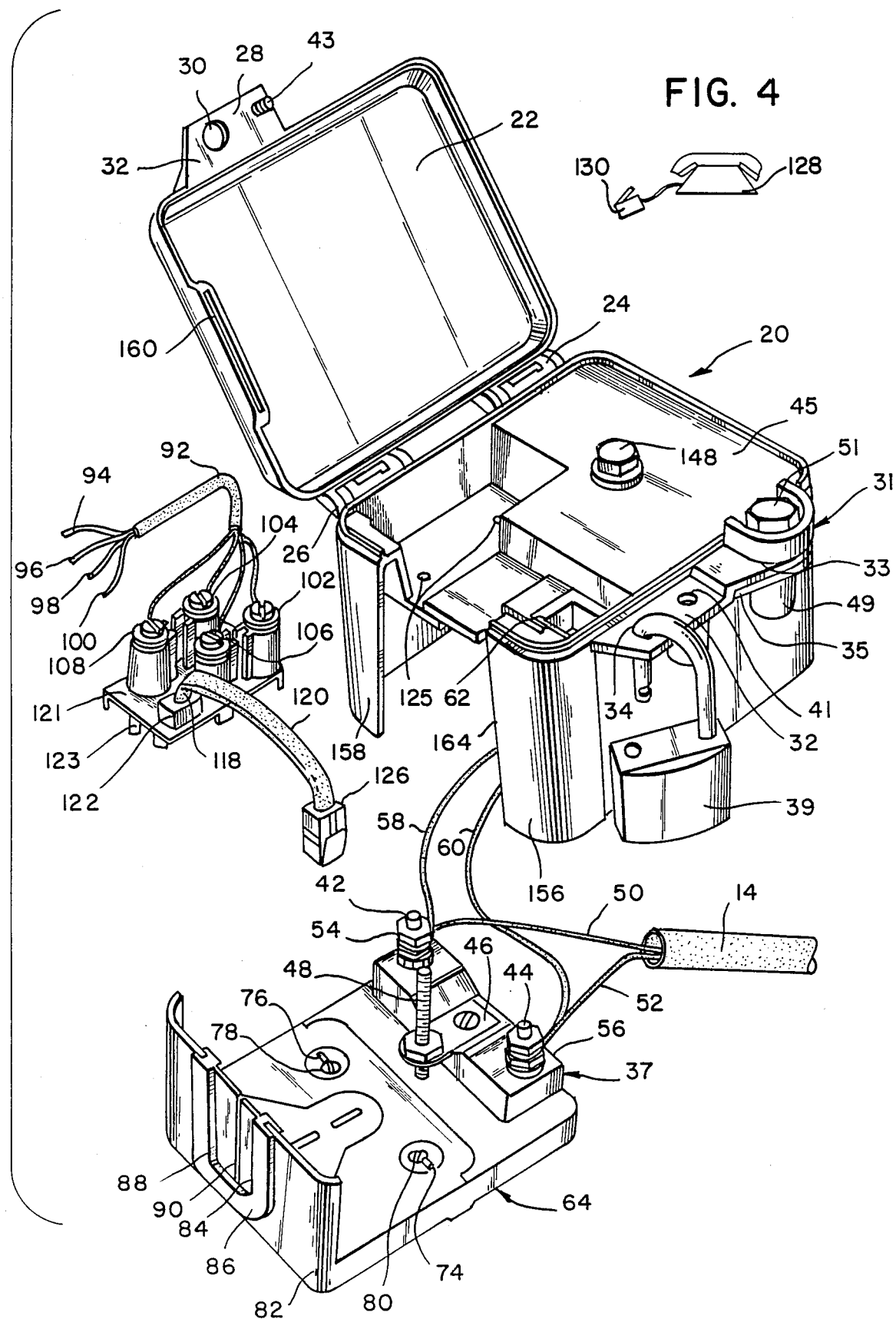

STATION INTERFACE AND PROTECTOR APPARATUS

BACKGROUND OF THE INVENTION

1. Field of the Invention

The present invention relates to telephone interface apparatuses and jacks, and more particularly, to a station interface and protector apparatus which permits isolation of a subscriber's telephone line wiring from the incoming telephone lines in order to isolate problems appearing on the telephone lines and provides a device for a subscriber to lock the interface apparatus while permitting the telephone company serviceman to override the subscriber's lock for servicing.

2. Discussion of the Relevant Art

With the advent of the breakup of the telephone company as it was formerly known, individual customers are permitted to connect their own independently purchased telephones to the incoming telephone lines. In order to minimize the amount of tampering and/or connections that a customer will make to the lines already installed on their premises, numerous systems and devices have been invented to permit connection by the consumer of an owner purchased telephone, which has a modular plug disposed on the distal end of its line cord. This modular plug is adapted to be received into a modular jack or receptacle and thus, the normal terminal block installed by the telephone company is required to have an adapter connected thereon capable of receiving a telephone line cord plug. Typical of these converters is the apparatus disclosed in U.S. Pat. No. 4,188,505 issued to R. J. O'Connor which provides for a simple conversion from a conventional terminal block to a modular type receptacle or jack.

Another type of device utilized with these plug-in receptacles is disclosed in U.S. Pat. No. 4,047,787 issued to B. W. Gumb, et al on Sept. 13, 1977 which permits a singular modular plug similar to that found on the distal end of a telephone line cord to be coupled to a housing in which a plurality of receptacles disposed in parallel are incorporated. These additional receptacles permit the use of several pieces of equipment all being in parallel with the telephone line into which the line plug has been inserted.

Yet another type of apparatus disclosed in U.S. Pat. No. 4,103,985 issued to R. F. Krolak on Aug. 1, 1978 utilizes a plurality of telephone modular receptacles and a in-line multi-terminal connector permitting the interconnection of telephone equipment and telephone signal equipment.

None of these devices relate to an apparatus which is to be connected at the point where the incoming telephone line pair joins the subscriber's in house wiring. Where the connection is usually made, an apparatus is provided with terminals for the wires and generally includes overvoltage or surge protection. Now that the subscriber or customer is able to connect his own equipment to the incoming telephone lines it is advantageous to be able to isolate the incoming telephone lines provided by the telephone company from the subscriber's or customer's in house wiring so that if a problem should arise on the telephone line one could isolate the problem appearing on the input telephone lines from a problem caused by improper wiring in the subscriber's residence. The incoming telephone lines may be readily disconnected from the subscriber's wiring by removal of a modular cable plug provided in the apparatus described herein, when removed from its receptacle. The apparatus provides direct access to the incoming telephone lines and by placing a known operating telephone line cord jack into this receptacle it can be determined that the incoming telephone lines are operating properly, thus eliminating them as being the source of the problem.

Typical of devices capable of performing the above function is U.S. Pat. No. 4,488,008 issued to Dellinger, et al on Dec. 11, 1984 and U.S. Pat. No. 4,624,514 issued to Thomas J. Smith on Nov. 25, 1986. However, these devices have a common shortcoming in that the top cap or cover includes a through bolt and/or is made in two pieces. This makes these devices unsuitable for use outdoors, since a path is provided for liquid to penetrate within the housing, and thus, may cause shorting of the telephone lines disposed therein.

Therefore it is an object of the present invention to provide a device that has a unitary top cover and no apertures disposed therein, thus making it ideally suitable for use in the outdoors.

It is another object of the present invention to provide a device that can be readily installed by a telephone subscriber that permits separation of the incoming telephone lines from the subscriber's phone wiring.

It is still another object of the present invention to provide a replacement housing that may readily be connected to an existing base and is an overvoltage protection device that provides terminals for receiving the subscriber's in house wiring yet maintains continuity with the incoming telephone lines.

It is yet another object of the present invention to provide a station interface and protector apparatus that is capable of separating the incoming telephone liens from the subscriber's in house wiring and is capable of handling more than a single input telephone line pair.

It is still yet another object of the present invention to provide a reliable inexpensive, weather protected housing suitable to replace the housing presently utilized by the telephone company to connect the subscriber's in house wiring with the incoming telephone lines and yet provides a simple means for isolating the input telephone lines from the subscriber's in house telephone wiring.

It is further another object of the present invention to provide a means for permitting a subscriber to close and lock the apparatus to prevent unwarranted tampering while permitting access by the telephone company's serviceman having his own access device.

SUMMARY OF THE INVENTION

A station interface and protector apparatus for use on a telephone line pair connected to a subscriber's telephone line pair, according to the principles of the present invention, comprises in combination; a protector device which includes a pair of terminals adapted to receive thereon an incoming telephone line pair and a ground terminal adapted to receive a ground wire thereon. An overvoltage protection device is connected between each of the line terminals and the ground terminal and is disposed on an insulated base having only one wall which is adapted to receive the telephone lines therethrough and may be mounted to a surface. A cover, covers the overvoltage protector device, includes a receptacle or jack adapted to receive a modular plug disposed on the distal end of a plug-in telephone line cord and has at least two terminals. The receptacle terminals are electrically connected to the line terminals. At least two station terminals are disposed in the cover and are adapted to receive the subscriber's telephone line pair thereon. A cable connection having a plurality of wires therein has one end connected to each of the station terminals and the other distal ends of the wires terminated in a modular plug similar to the plug disposed on the distal end of the plug-in telephone line cord so that either of the plugs may be placed in a housing receptacle to continue the incoming telephone line pair. The cover additionally includes a captured rotating nut which functions to hold the cover onto the protecting device by means of being threaded on to the upwardly extending threaded ground terminal. The cover is also provided with an outwardly extending lips which are disposed on another edge opposite the hinge provided thereon. The lip is provided with a threaded receptacle adapted to receive a threaded bolt therein. A cap adapted to cooperate with the hinge includes an outwardly extending lip which is disposed on another edge opposite the hinge cooperating device and is displaced from the cover lip when the cap covers the cover. The cover lip includes a pair of through apertures, one of the apertures is adapted to receive a locking device therethrough and the other aperture is adapted to clear a screw therethrough. A bracket has a first portion extending beneath the cap extending lip and includes a first aperture aligned with the cap locking aperture and a second threaded aperture adapted to receive a screw therein when the cap rests upon the cover. A second portion of the bracket extends above the cover lip and has a clearance aperture adapted to clear the threaded bolt therethrough when the cap rests upon the cover.

The foregoing and other objects and advantages will appear from the description to follow. In the description reference is made to the accompanying drawing which forms a part hereof, and in which is shown by way of illustration a specific embodiment in which the invention may be practiced. This embodiment will be described insufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which:

FIG. 4 is an exploded isometric view of the station interface and protector apparatus shown in FIG. 1 with the base member, including the overvoltage protection device exposed and the terminal lock removed from the cap;

DESCRIPTION OF THE PREFERRED EMBODIMENT

Figure 1:
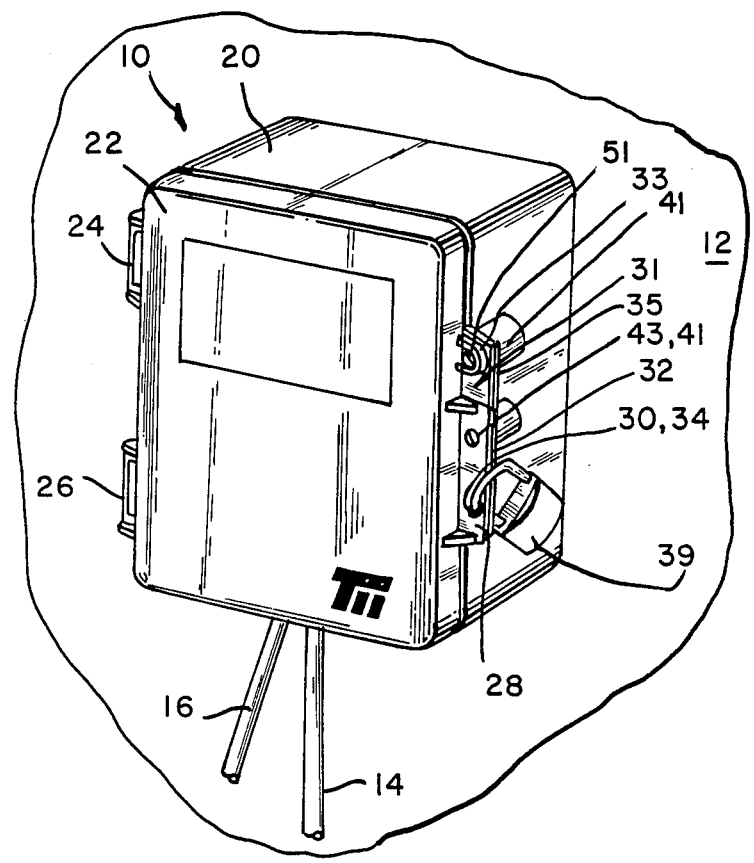
FIG. 1 is a pictorial representation of a station interface and protector apparatus, according to the principles of the present invention.

Referring now to the Figures, and in particular to FIGS. 1 through 4, there is shown (FIG. 1) a perspective view of a station interface and protector apparatus 10 according to the principles of the instant invention, fixed to a vertical wall 12 which may be part of a customer's or a subscriber's residence. The telephone company provides at least one pair of input wires in a cable 14 which may include a second cable 16 for an additional pair of telephone wires which are brought from the telephone pole, not shown, to the subscriber's residence.

the station interface and protector apparatus 10 includes a cover 20 and a cap 22 which is hingedly attached by means of a pair of hinges 24 and 26 to the cover 20. An extending lip portion 28 provided on cap 22 has a clearance aperture 30 disposed therein, and thus, provides a means for locking the cap 22 to the cover 20, since the lip portion 28 of the cover 22 cooperates with a first portion 32 of locking bracket 31 which is provided with an aperture 34 (See FIGS. 3, 4, 7, and 8).

Figure 3:
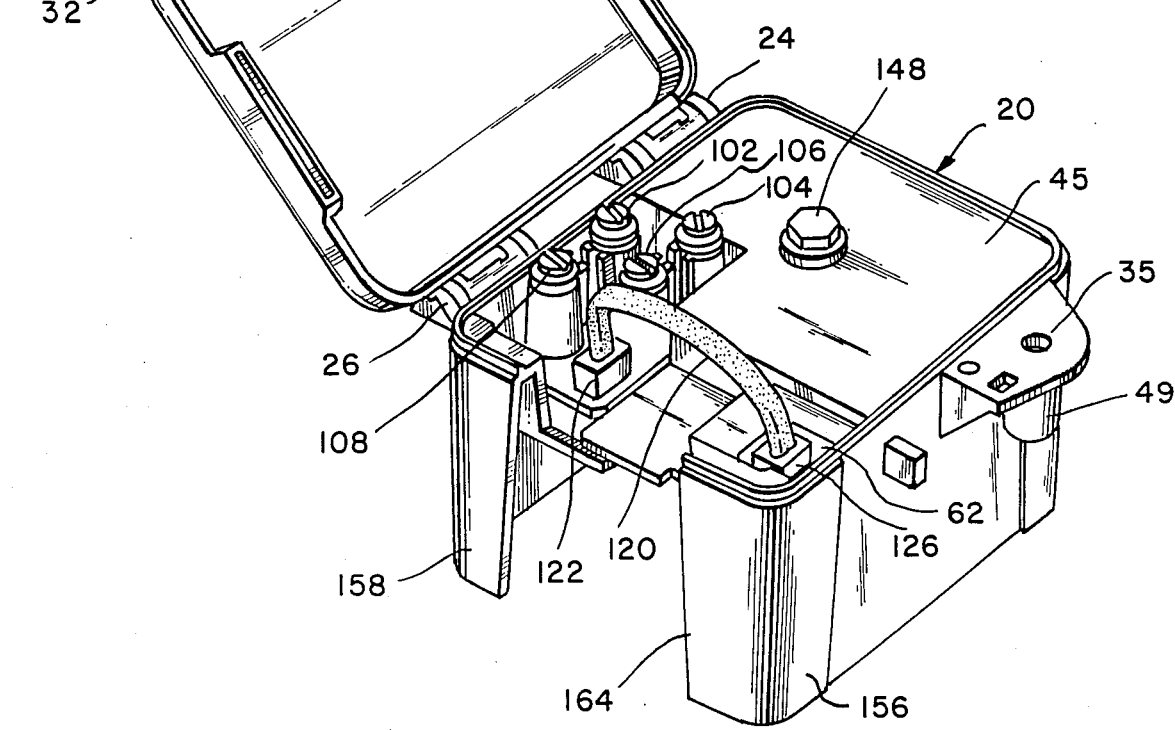
FIG. 3 is a pictorial representation of the cover and cap of the station interface and protector apparatus shown in FIG. 2 with the cap in an open position.

The first portion 32 of bracket 31 extends beneath lip portion 28 and includes a second portion 33 which extends above an extending lip portion 35 provided on the cover 20 (FIG. 3). The clearance aperture 34 of bracket 31 is concentric with clearance aperture 30 disposed on the cover lip portion 28 when cap 22 rests upon cover 20 and is suitable for receiving a locking device 39 as shown, or any other locking device selected by the subscriber. An additional, preferably threaded aperture 41 is provided in the fist portion 32 of bracket 31 which is adapted to receive a standard screw 43 therein for holding bracket 31 to cap 22. Thus, by removing locking device 39 and screw 28, the cap 22 may be opened exposing the top 45 of the cover or housing 20. The second portion 33 of bracket 31 is provided with a clearance aperture 47 which is concentric with a threaded aperture 49 provided on the extending lip 35 of cover 20 when the cap 22 rests upon the cover 20. A threaded bolt 51 suitable for being received by threaded aperture 49 will hold the bracket 31 to the cover 20. The bolt 51 is preferably provided with a head that is non-standard or unique. The telephone serviceman is provided with a mating tool, not shown, which will cooperate with the head of bolt 51 enabling him to remove the bolt when it is necessary to service and/or remove the cover 20 of the station interface protection apparatus 10.

An overvoltage protection device 36 (See FIG. 5) may include a pair of gas tubes, not shown, or a single device 37 having the same capabilities, embedded in an epoxy material which is electrically insulated and hides the tubes from view (See FIG. 4). The overvoltage protection device 36 or 37 includes a pair of line terminals 42 and 44 and a ground terminal 46. Ground terminal 46 includes an upwardly extended threaded stud 48 whose function will be explained hereinafter. Line terminals 42 and 44 also include threaded studs and are adapted to receive the input telephone line wires 50 and 52 provided in cable 14 with the aid of nuts 54 and 56, respectively, in a conventional manner, and also receive wires 58 and 60 which are connected to the rear of modular jack or receptacle 62. Modular jack or receptacle 62 is generally of the type disclosed in U.S. Pat. No. 3,850,497.

Figure 5:
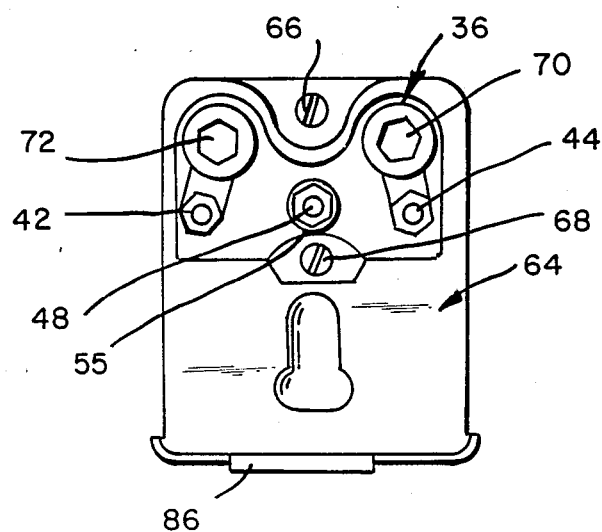
FIG. 5 is a top plan view of an overvoltage protection device which may include a base member.
Figure 2:
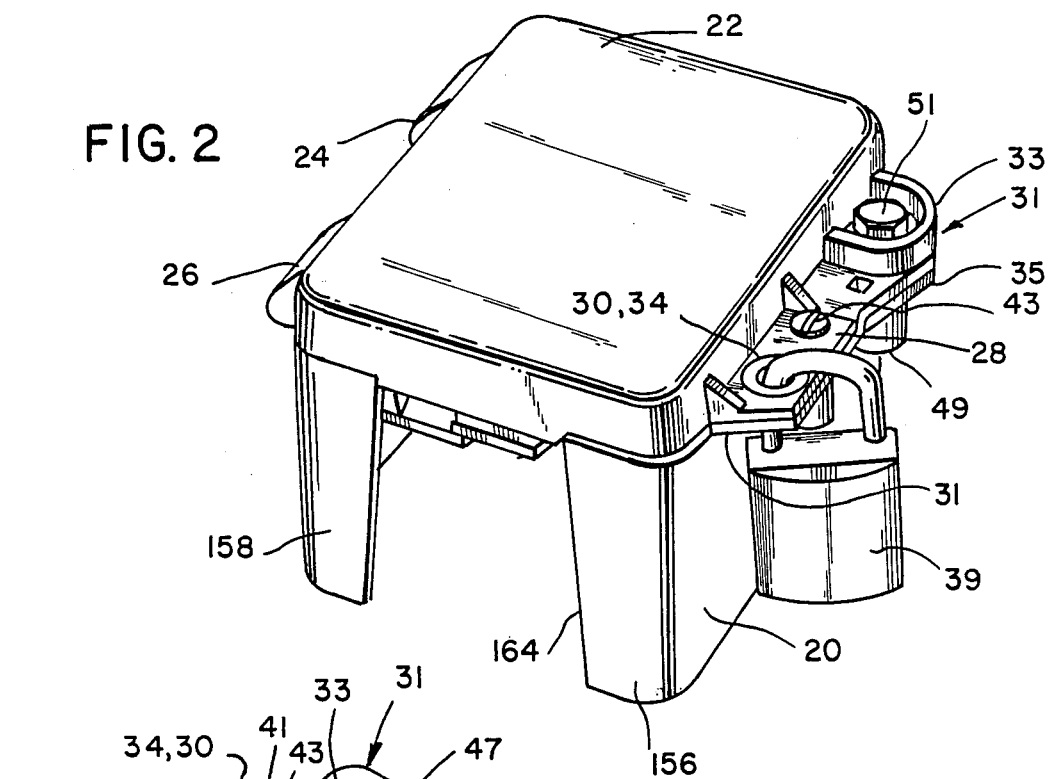
FIG. 2 is an isometric view of the station interface, cover and cap shown in FIG. 1.

Overvoltage protection device 36 or 37 may be fabricated in one integral piece to include a base portion 64 or the base portion or member 64 may be fabricated as a separate component with the overvoltage protection device 36 affixed thereto in a conventional manner by means of screws 66 and 68 as shown in FIG. 5. The overvoltage protection device 36 shown in FIG. 5 is of a different type than that shown in FIG. 4 since the gas tubes used to protect the telephone lines may be removed and replaced by the removal of cap nuts 70 and 72.

The base portion or member 64 is provided with apertures 74 and 76 (FIG. 4) which is adapted to receive screws 78 and 80, respectively, so that the mounting base portion or member 64 may be affixed to a flat surface. Base portion 64 may also be provided with a vertically upstanding wall 82 which is provided with an opening 84 that is provided with a U-shaped channel member 86 of insulating material which has inserted therein, resilient member 88 having a slit 90 provided therein. Resilient member 88 is adapted to receive the input line cable wires 50 and 52 from cable 14 therethrough as well as cable wire 92 which includes wires 94, 96, 98 and 100 that are connected to terminals 102, 104, 106 and 108, respectively, and are labeled red (R), green (G), yellow (Y), and black (B), respectively, for the convenience of the subscriber. The rear ends of terminals 102, 104, 106 and 108 are connected, in a conventional manner, to one end 118 of cable 120 which is retained in removable bracket 121 by a conventional clamping device 122. The removable bracket 121 is inserted in cover 20 and removably held there by extending protrusions 123 being retained by apertures 125 disposed in the cover 20. The other distal end 124 of cable 120 is terminated in a modular plug 126 which is adapted to mate and cooperate with a receptacle or jack 62 and provide a continuous electrically conductive path from the wires 50 and 52 of input line cable 14 to receptacle 62 and through plug 126 to terminals 102, 104, 106 and 108.

Figure 6:
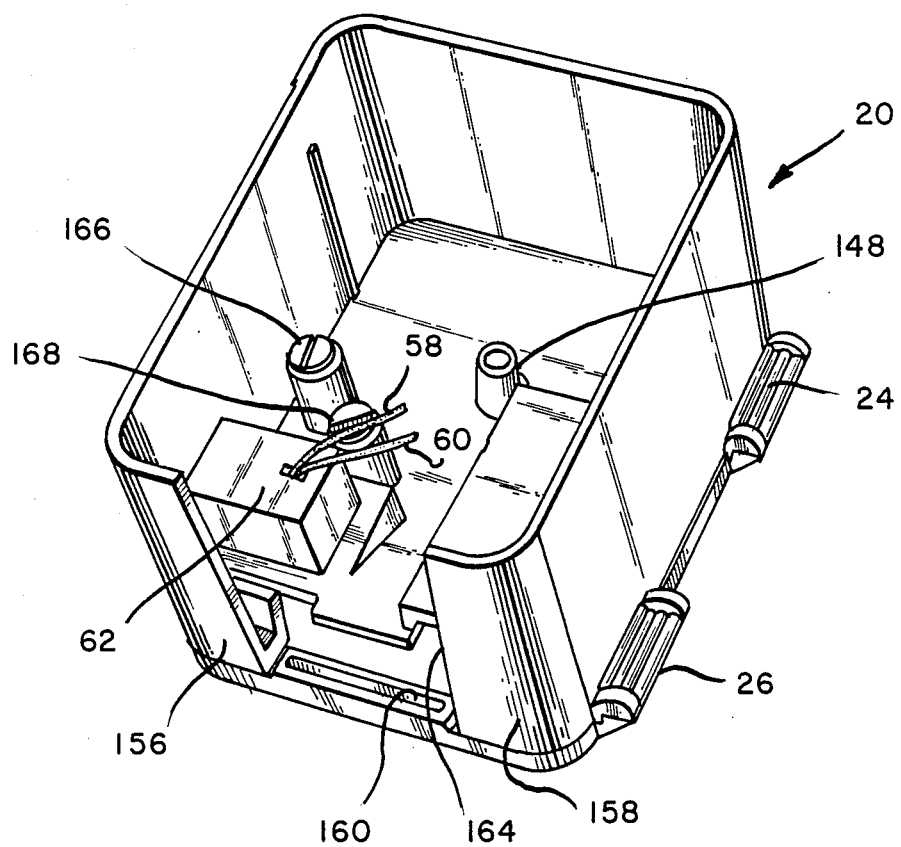
FIG. 6 is a pictorial representation of the underside of the cover member shown in FIG. 2 with the cap removed.

Although one overvoltage protection device 36 or 37 is shown in FIGS. 4 through 5 it is to be clearly understood that the base portion 64 is suitable for having two such devices affixed thereon or fabricated as an integral part thereof and they may be wires as specifically shown in FIG. 6 of U.S. Pat. No. 4,624,514, which is incorporated herein in its entirety, with the second overvoltage protection device and its associated wiring being indicated by the primed numbers shown thereon.

The cover 20 is also provided with a non-standard or unique flared nylon nut 148 having a configuration similar to bolt 51 which is captured by the top surface 150 of the cover 20 and is adapted to receive ground terminal 46 or 48 therein. Thus, when cover 20 is placed upon the base 64, the nut 148 may be used to retain the cover 20 thereon and when the cap 22 is closed down upon the cover 20 the station interface protector apparatus 10 is completely closed off from the external elements.

Figure 9:
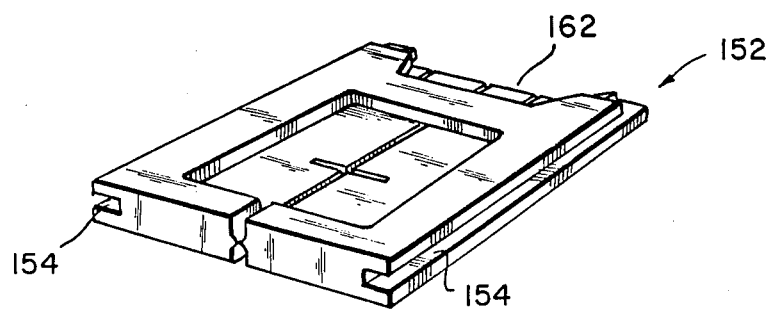
FIG. 9 is a pictorial representation of a wall grommet utilized in lieu of a base member.
Figure 7:
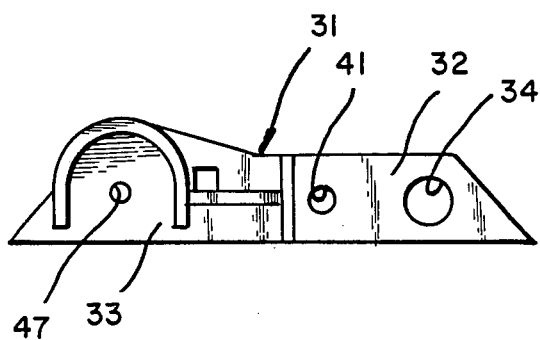
FIG. 7 is a to plan view of the removable bracket that provides for the subscriber cap lock with the telephone company override.
Figure 8:
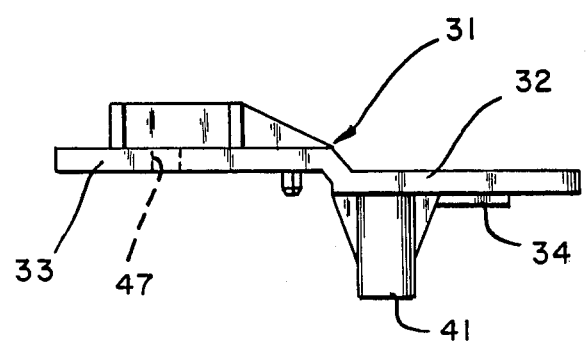
FIG. 8 is an end view in elevation of the bracket shown in FIG. 7.

In an alternative embodiment, the cover 20 is provided with a large grommet 152 essentially forming one wall of the cover 20 (See FIG. 9) and held therein by the channels 154 provided on two edges of the grommet 152 which are received by two lips 156 and 158 provided on the cover 20. The cap 22 is provided with an elongated slot 160 which is adapted to receive an elongated protrusion 162 provided on grommet 152 when the cap 22 is closed upon the cover 20.

In operation when a telephone company updates a subscriber's telephone equipment to provide for telephone instruments having modular plugs thereon, a telephone company serviceman may readily update the equipment to include the station interface and protector apparatus 10, as disclosed herein, by removing the cover presently protecting the overvoltage protection device appearing at the termination of the incoming telephone lines. If the overvoltage protection device is not provided with a base portion 64 as shown herein, the serviceman may mount the base portion to a nearby surface and mount the overvoltage protection device onto the base portion as shown in FIG. 4 or alternatively the serviceman may affix the cover 20 as shown in FIG. 6 with grommet 152 disposed therein directly to the ground stud 48 provided on the overvoltage ground terminal 46. The grommet 152, when installed, fills the wall opening 164 of cover 20. Extra line terminals 166 and 168 are provided for connection of external electronic devices should it be required. The telephone company serviceman will then cut the telephone wires connected to terminals 42 and 44, or remove them in a conventional manner if they are provided with conventional spade lugs, and replace the two wires removed from terminals 42 and 44 on the overvoltage protection device with the two wires 58 and 60 extending from rear of receptacle 62 of the instant invention. The two wires thus removed from the overvoltage protection device are then connected to terminals 102 and 104 on cover 20 maintaining the proper color arrangement or if they are color coded in a manner which is different than indicated on the cover 20 terminals 102 and 104 will be utilized. Thus, with plug 126 inserted into receptacle 62, continuity will be maintained from the input telephone lines to terminals 102 and 104. Jacks, not shown, wired throughout the house may then be brought to terminals 102 and 104 and if the color code arrangement is maintained.

If multiple telephones (extensions) are to be connected on the same line pair then they are connected to terminals 102 and 104 maintaining the proper color code arrangement.

Should the subscriber experience some difficulty on a particular telephone line it is only necessary that he open the cap 20 and using a known operating telephone it can be inserted into receptacle 62 after removing plug 126 therefrom. By operating the telephone he can then determine whether the problem arising has been introduced by the internal house wiring or occurs in the incoming telephone line, since if the telephone operates correctly while plugged into receptacle 62 the telephone input lines are in good working order and the problem must have been generated by the wiring within the residence. If improper operation occurs with the operating telephone inserted into receptacle 62, the problem is in the input telephone line pair and the telephone company must be contacted to locate the problem and effect the repair. The telephone serviceman having the proper tool to mate with bolt 51 and nut 148 may open the cap 20 and remove the cover 22 even f a lock 39 has been placed thereon by the subscriber and thus, may perform the repairs without the need for the subscriber to remove his locking device.

Hereinbefore has been disclosed an inexpensive, simply installed, station interface and protector apparatus which is capable of providing isolation from the input telephone lines to the subscriber's residential telephone lines thereby providing a convenient, easily usable, means for isolating the input lines from the residence lines.

It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention, what is claimed is:

1. A station interface and protector apparatus for use on an incoming telephone line pair connected to a subscriber's telephone line pair, comprises in combination:
   A. protector means including;
      (i) a pair of terminals adapted to receive thereon said incoming telephone line pair,
      (ii) a ground terminal adapted to receive thereon a ground wire,
      (iii) an overvoltage protection device connected between each said line terminals and said ground terminal, and
      (iv) insulated base means having only one wall, said wall being adapted to receive said telephone line pairs therethrough means for mounting to a surface and adapted to receive said overvoltage protection device, said ground terminal being affixed in said base means; and means for mounting to a surface and adapted to receive said overvoltage protection device;
   B. cover means for covering said base means and said protector means, said cover means including;
      (i) receptacle means of the type adapted to receive a plug disposed on the distal end of a plug-in telephone line cord and having at least two terminals,
      (ii) connection means for electrically connecting said receptacle terminals to said line terminals,
      (iii) at least two station terminals disposed in said cover means, said station terminals being adapted to receive said subscriber telephone line pair,
      (iv) cable connection means having a plurality of wires therein, one end of each of said wires being connected to each of said station terminals, the other distal ends of said wires being terminated in a plug similar to said plug disposed on the distal end of plug-in telephone line cord so that when either of said plugs is placed in said receptacle said telephone line pair is continued,
      (v) attaching means cooperating with said ground terminal for removably attaching said cover means to said protector means and completely covering said base means,
      (vi) hinge means disposed on one edge of said cover means, and
      (vii) outwardly extending lip means said lip means being disposed on another edge opposite said hinge means, said lip means being provided with a threaded receptacle adapted to receive a threaded bolt therein;
   C. cap means, said cap means having;
      (i) means for cooperating with said cover hinge means disposed along one edge thereof for completely covering said cover means, and
      (ii) outwardly extending lip means, said lip means being disposed on another edge opposite said hinge cooperating means and displaced from said cover means lip means when said cap means covers said cover means, said lip means including a pair of through apertures, one of said apertures being adapted to receive a locking device therethrough, the other aperture being adapted to clear a screw therethrough; and
   D. bracket means, said bracket means having;
      (i) a first portion extending beneath said cap means extending lip means, said first portion having a first aperture aligned with said cap means locking device aperture and a second threaded aperture adapted to receive said screw therein when said cap means rests against said cover means, and
      (ii) a second portion extending above said cover means lip means said second portion having a clearance aperture adapted to clear said threaded bolt therethrough when said cap means rests upon said cover means.

2. A station interface and protector apparatus for use on an incoming telephone line pair connected to a subscriber's telephone line pair, said telephone line pair being disposed upon a pair of terminals provided on an overvoltage protection device, said overvoltage protection device including a ground terminal having a ground wire thereon, comprising in combination:
   A. cover means for covering said protection device, said cover means including;
      (i) receptacle means of the type adapted to receive a plug disposed on the distal end of a plug-in telephone line cord and having at least two terminals,
      (ii) connection means for electrically connecting said receptacle terminals to said line terminals,
      (iii) at least two station terminals disposed in said cover means, said station terminals being adapted to receive said subscriber telephone line pair,
      (iv) cable connection means having a plurality of wires therein, one end of each of said wires being connected to each of said station terminals, the other distal ends of said wires being terminated in a plug similar to said plug disposed on the distal end of said plug-in telephone line cord so that when either of said plugs is placed in said receptacle said telephone line pair is continued,
      (v) attaching means cooperating with said ground terminal for removably attaching said cover means to said ground terminal and completely covering said protection device,
      (vi) hinge means disposed on one edge of said cover means, and
      (vii) outwardly extending lip means said lip means being disposed on another edge opposite said hinge means, said lip means being provided with a threaded receptacle adapted to receive a threaded bolt therein;
   B. cap means, said cap means having;

(i) means for cooperating with said cover hinge means disposed along one edge thereof for completely covering said cover means, and (ii) outwardly extending lip means, said lip means being disposed on another edge opposite said hinge cooperating means and displaced from said cover means lip means when said cap means covers said cover means, said lip means including a pair of through apertures, one of said apertures being adapted to receive a locking device therethrough, the other aperture being adapted to clear a screw therethrough; and C. bracket means, said bracket means having;

(i) a first portion extending beneath said cap means extending lip means, said first portion having a first aperture aligned with said cap means locking device aperture and a second threaded aperture adapted to receive said screw therein when said cap means rests upon said cover means, and (ii) a second portion extending above said cover means lip means said second portion having a clearance aperture adapted to clear said threaded bolt therethrough when said cap means rests upon said cover means.

3. A station interface and protector apparatus according to claims 1 or 2 wherein said attaching means includes retained nut means disposed on said cover means, and said ground terminal is threaded and upwardly extending, said cover means being adapted to cooperate with said threaded ground terminal for retaining said cover means and said cap means on said ground terminal.

4. A station interface and protector apparatus according to claims 1 or 2 wherein said station terminals are disposed on a removable terminal block.

5. A station interface and protector apparatus according to claim 2 further including grommet means, said grommet means essentially forming one wall of said cover means for passing said subscriber telephone line pair and said plurality of cable connection means wires therethrough.

* * * * *